US012716461B2

(12) United States Patent
Aizpurua Aldasoro et al.

(10) Patent No.: US 12,716,461 B2
(45) Date of Patent: Aug. 25, 2026

(54) DAMPER FOR A WIND TURBINE

(71) Applicant: Siemens Gamesa Renewable Energy A/S, Brande (DK)

(72) Inventors: Hodei Aizpurua Aldasoro, Hamburg (DE); Marc Seidel, Osnabrück (DE); Antonio Ibañez de Alba, Daimiel (ES)

(73) Assignee: Siemens Gamesa Renewable Energy A/S, Brande (DK)

( * ) Notice: Subject to any disclaimer, the term of this patent is extended or adjusted under 35 U.S.C. 154(b) by 200 days.

(21) Appl. No.: 17/773,487

(22) PCT Filed: Nov. 12, 2020

(86) PCT No.: PCT/EP2020/081967

§ 371 (c)(1),
(2) Date: Apr. 29, 2022

(87) PCT Pub. No.: WO2021/094489

PCT Pub. Date: May 20, 2021

(65) Prior Publication Data

US 2024/0167531 A1 May 23, 2024

(30) Foreign Application Priority Data

Nov. 14, 2019 (ES) .................................. 201900170
Jan. 16, 2020 (ES) .................................. 202000009

(51) Int. Cl.
*F16F 7/10* (2006.01)
*F03D 80/80* (2016.01)

(52) U.S. Cl.
CPC ............ *F16F 7/1034* (2013.01); *F03D 80/88* (2016.05); *F05B 2260/964* (2013.01)

(58) Field of Classification Search
CPC . C09K 8/06; F03D 13/20; F03D 80/00; F03D 80/50; F03D 80/80; E04H 9/0215;
(Continued)

(56) References Cited

U.S. PATENT DOCUMENTS 4,223,691 A 9/1980 Titus
6,017,856 A * 1/2000 Van Ooyen .............. C09K 8/06 507/141

(Continued)

FOREIGN PATENT DOCUMENTS

CN 1375040 A 10/2002
CN 1681905 A 10/2005

(Continued)

OTHER PUBLICATIONS

PCT International Search Report and Written Opinion of International Searching Authority mailed Mar. 2, 2021 corresponding to PCT International Application No. PCT/EP2020/081967 filed Nov. 12, 2020.

*Primary Examiner* — Vishal R Sahni
(74) *Attorney, Agent, or Firm* — Schmeiser Olsen PLLC

(57) ABSTRACT

A damper for damping movements of a wind turbine, in particular for damping oscillatory movements of a tower of the wind turbine is provided. The damping of the movements is achieved by an aqueous liquid contained in a container of the damper. The aqueous liquid includes water and the components included in the aqueous liquid are completely dissolved. The composition includes a citrate, e. g. potassium citrate and/or sodium citrate. A wind turbine including the damper is also provided. Finally, a specific composition is provided. The composition is destined to be dissolved, e. g. in water, to result in the aqueous liquid.

9 Claims, 1 Drawing Sheet

(58) Field of Classification Search
CPC ........... F05B 2240/40; F05B 2260/964; Y02E 10/72; Y02E 10/728
See application file for complete search history.

(56) References Cited

U.S. PATENT DOCUMENTS

| | | | | |
|---|---|---|---|---|
| 6,422,314 | B1 * | 7/2002 | Todd | C09K 8/08 507/140 |
| 2002/0034575 | A1 | 3/2002 | Merkt et al. | |
| 2004/0104375 | A1 * | 6/2004 | Pellet | C23F 11/126 252/75 |
| 2006/0079406 | A1 * | 4/2006 | Dobson | C09K 8/08 507/213 |
| 2006/0113513 | A1 | 6/2006 | Nilsson et al. | |
| 2006/0147306 | A1 | 7/2006 | Zheng et al. | |
| 2008/0004198 | A1 * | 1/2008 | Joinson | C11D 17/045 510/297 |
| 2009/0057607 | A1 * | 3/2009 | Evans | C09K 5/10 252/73 |
| 2010/0021303 | A1 | 1/2010 | Nielsen et al. | |
| 2013/0040036 | A1 | 2/2013 | Kyser et al. | |
| 2013/0078349 | A1 * | 3/2013 | Newman | A23B 2/20 252/73 |
| 2015/0000952 | A1 | 1/2015 | Schultz | |
| 2017/0145284 | A1 | 5/2017 | Davidson et al. | |
| 2017/0354901 | A1 | 12/2017 | Collins et al. | |
| 2018/0104191 | A1 * | 4/2018 | Zhu | A61K 9/1611 |
| 2018/0216051 | A1 * | 8/2018 | Thomas | C11D 17/045 |
| 2019/0284511 | A1 * | 9/2019 | Oehlenschlaeger | C11D 3/38636 |
| 2021/0363510 | A1 * | 11/2021 | Kaasgaard | C11D 3/38645 |
| 2022/0186153 | A1 * | 6/2022 | Ferguson | C11D 3/3765 |
| 2024/0167531 | A1 * | 5/2024 | Aizpurua Aldasoro | F03D 80/88 |

FOREIGN PATENT DOCUMENTS

| | | | | | |
|---|---|---|---|---|---|
| CN | 101423441 | A | * | 5/2009 | |
| CN | 104800180 | A | * | 7/2015 | |
| CN | 105670573 | A | * | 6/2016 | C09K 5/20 |
| CN | 106082460 | A | | 11/2016 | |
| CN | 106999796 | A | | 8/2017 | |
| CN | 109706003 | A | | 5/2019 | |
| DE | 19622573 | A1 | * | 12/1996 | C10M 105/14 |
| DE | 102015224469 | | * | 6/2017 | |
| EP | 0922079 | A1 | | 6/1999 | |
| EP | 1020233 | A1 | | 7/2000 | |
| EP | 1203155 | A1 | | 5/2002 | |
| EP | 1584984 | A1 | * | 10/2005 | G03F 7/3071 |
| EP | 2899397 | A1 | * | 7/2015 | F03D 13/20 |
| EP | 3178901 | A1 | * | 6/2017 | C09K 8/04 |
| ES | 2224788 | A1 | | 3/2005 | |
| ES | 2679673 | T3 | * | 8/2018 | A61F 9/0026 |
| GB | 1081233 | A | | 8/1967 | |
| GB | 2251876 | A | * | 7/1992 | C09K 8/06 |
| JP | S5883059 | A | | 5/1983 | |
| JP | H04191543 | A | | 7/1992 | |
| JP | 2005041896 | A | | 2/2005 | |
| JP | 2006189047 | A | | 7/2006 | |
| JP | 2016014331 | A | | 1/2016 | |
| KR | 19990022907 | A | * | 3/1999 | |
| KR | 20110028804 | A | * | 9/2014 | |
| TW | 201002817 | A | | 1/2010 | |
| WO | 9808912 | A1 | | 3/1998 | |
| WO | WO-9808914 | A1 | * | 3/1998 | C09K 8/06 |
| WO | 2005118742 | A2 | | 12/2005 | |
| WO | WO-2008155160 | A1 | * | 12/2008 | C11D 1/83 |
| WO | WO-2009040091 | A1 | * | 4/2009 | F16F 13/14 |
| WO | WO-2015104308 | A1 | * | 7/2015 | C09K 8/54 |
| WO | WO-2016037958 | A1 | * | 3/2016 | E01F 8/0005 |
| WO | WO-2019201785 | A1 | * | 10/2019 | C11D 3/38636 |
| WO | WO-2020150685 | A1 | * | 7/2020 | |
| WO | WO-2020208056 | A1 | * | 10/2020 | C11D 3/38636 |

* cited by examiner

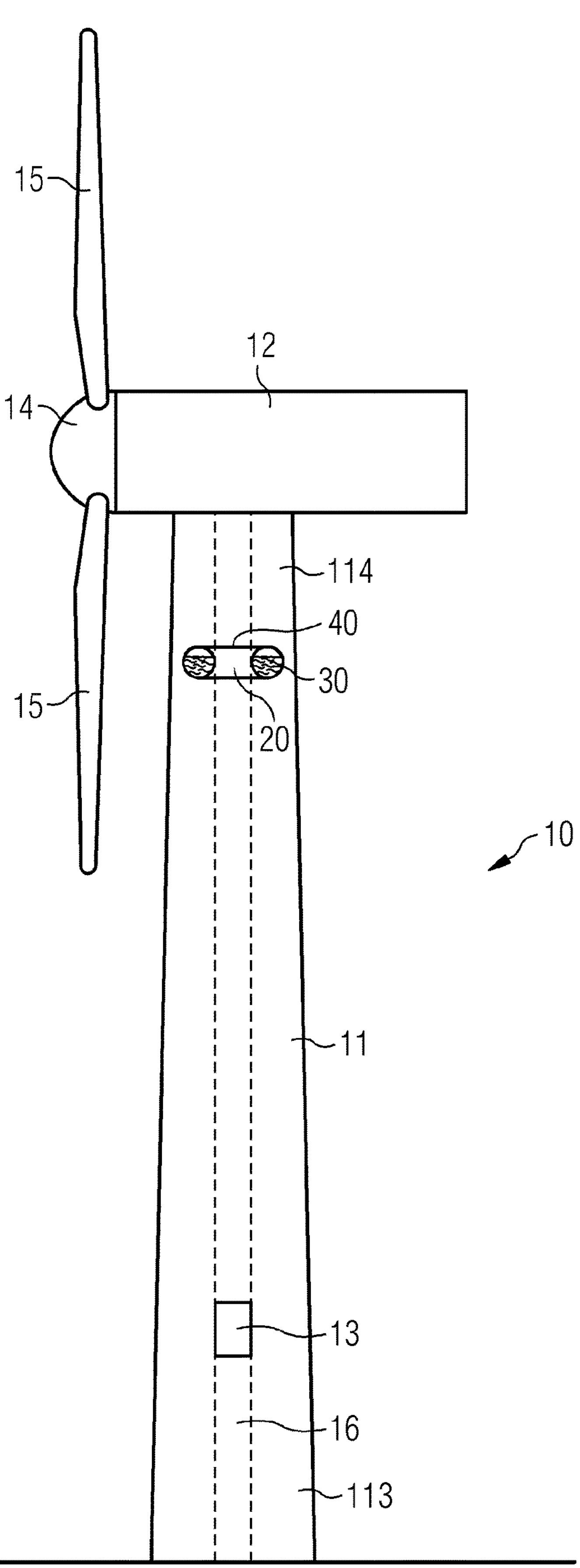
15
12
14
114
40
30
15
20
10
11
13
16
113

DAMPER FOR A WIND TURBINE

CROSS-REFERENCE TO RELATED APPLICATIONS

This application claims priority to PCT Application No. PCT/EP2020/081967, having a filing date of Nov. 12, 2020, which claims priority to EP Application No. P202000009, having a filing date of Jan. 16, 2020, and EP Application No. P201900170, having a filing date of Nov. 14, 2019, the entire contents all of which are hereby incorporated by reference.

FIELD OF TECHNOLOGY

The following relates to a damper for damping movements of a wind turbine, in particular for damping oscillatory movements of a tower of the wind turbine. The damping of the movements is achieved by an aqueous liquid contained in a container of the damper. Such types of dampers are commonly referred to as slosh dampers. The following further relates to an aqueous liquid for use in the damper which significantly improves the damping efficiency of the damper.

The following further relates to a wind turbine comprising the damper and to a composition to be dissolved in a liquid so as to result in the aqueous liquid to be used in a damper of a wind turbine.

BACKGROUND

It is known to provide a damper in a wind turbine to reduce undesired movements, e. g. undesired oscillations, of the wind turbine. Such a damper may be located at the top of the tower and/or inside the nacelle. Alternatively, it may also be located outside of the nacelle or outside the tower.

Known types of dampers include slosh dampers or pendulum-like dampers. Slosh dampers (which are also referred to as liquid dampers) have a container with a liquid inside the container. The liquid passively damps the movement of the tower and/or nacelle of the wind turbine.

In the state of the art, the liquid in the container usually contains tap water and some kind of antifreeze, such as e. g. monoethylene glycol. For those installation sites, where a drop of the temperature below the freezing temperature of the water is highly unlikely, the addition of the antifreeze can be abstained from. An alternative to the use of the antifreeze agent is the provision of a heating device for heating the water in the container, if required.

EP 1 203 155 A1 mentions that sodium chloride could be added to the water of a liquid damper. Sodium chloride has the advantages that it is environmentally harmless, inexpensive and both lowers the freezing temperature of the water and increases the density. It has, however, the disadvantage that it fosters corrosion which could be detrimental for metallic parts of the damper, specifically for parts of the container of the damper.

Therefore, EP 1 203 155 A1 also proposes zinc chloride and ferrous sulphate. These compounds are described to be less aggressive to metals than sodium chloride, but would still be capable to increase the density of the liquid, thus increase the damping efficiency of the damper. However, these agents have the disadvantages that they are, at least to a certain extent, harmful for the environment.

Therefore, there exists the desire to provide a damper for a wind turbine which overcomes the described drawbacks of conventional art dampers. Specifically, a damper with a high damping efficiency and a high long-term stability, particularly against corrosion, shall be provided. Furthermore, an aspect relates to provide an improved wind turbine and to provide a composition for dissolving in water to increase the density of a liquid comprising the water and the composition dissolved therein, the liquid being suitable for a slosh damper of a wind turbine.

SUMMARY

A first aspect of embodiments of the present invention relates to a damper for damping movements of a wind turbine, in particular for damping oscillatory movements of a tower of the wind turbine. The damping of the movements is achieved by an aqueous liquid contained in a container of the damper.

The term "aqueous liquid" as used herein refers to a liquid being like water or containing water and/or which is made with water. The aqueous liquid comprises water.

According to embodiments of the present invention, the aqueous composition comprises a component, wherein the component dispersed in the aqueous liquid is selected from at least one citrate.

The term "dispers" or "dispersion" as used herein refers to a mixture of at least two components. Hereby, two or more components are dispersed, i. e. distributed finely, in a continuous component, i. e. in a dispersion medium.

Depending on the particle size of particles contained in the dispersion, such a dispersion may comprise the particles molecularly dispersed (true solution; particle size below 1 nm), colloidally dispersed (colloidal solution; particle size 1 nm to 1 μm) or coarsely dispersed (suspension comprising particle size of more than 1 μm).

According to the embodiments of present invention it is, however, not excluded for a dispersion to comprise the different particles being molecularly dispersed, colloidally dispersed and/or coarsely dispersed. Thus, a dispersion according to embodiments of the present invention may comprise particle sizes in the range of below 1 nm up to more than 1 μm.

The inventors have recognized that the at least one citrate could be an attractive alternative compared to sodium chloride for the use in a liquid damper.

As used herein, the term citrate relates to a derivative of the citric acid, the latter being a weak organic acid that has the generic chemical formula $C_6H_8O_7$. Citric acid occurs naturally in citrus fruits. Industrially manufactured citric acids are widely used as acidifier, as a flavouring and as a cleaning and chelating agent.

Citrates have the advantages to be environmentally friendly, i.e. non-toxic. Furthermore, they are neither corrosive nor oxidizing.

According to embodiments of the present invention, the at least one citrate is capable to significantly increase the density of an aqueous liquid.

Determination of the density of liquids is known by the person skilled in the art. E. g. determination of the density of the inventive liquid may be realised by using a PROTON densimeter (GAB Analysis Systems) with, e. g a scale of 1.400-1.500 specific gravity (s. g.) or, e. g. 1.500-1.600 s. g. at a standard temperature of 20° C. Density values as given herein depict experimental density.

The density of an advantageous aqueous liquid is at least 1.2 kg/L and/or up to 1.8 kg/L, or 1.3 kg/L and/or up to 1.7 kg/L, or 1.35 kg/L and/or up to 1.6 kg/L, or, 1.4 to 1.55 kg/L.

As a first example, the use of sodium citrate is proposed. "Sodium citrate" refers to any of the sodium salts of the citric acid, namely monosodium citrate, disodium citrate and trisodium citrate. In the European Union, the three forms of the salt are collectively known by the E number E331 (the E numbers are codes for substances or components used as food additives for use within the European Union and the European Free Trade Association). Sodium citrates are commonly used as acidity regulators in food and drinks, as emulsifiers for oils and to prevent donated blood from clotting in storage. The inventors have recognized that sodium citrate may advantageously be used in a slosh damper of a wind turbine.

As another example, the use of potassium citrate is proposed. "Potassium citrate" refers to any of the potassium salts of the citric acid, namely monopotassium citrate and tripotassium citrate. The tripotassium salt, for instance, is a potassium salt of citric acid with the molecular formula $K_3C_6H_5O_7$. It is a white, hygroscopic, crystalline powder. It is odourless with a saline taste. As a food additive, potassium citrate is used to regulate acidity and is known by the E number E332. Medicinally, it may be used to control kidney stones derived from either uric acid or cystine. The inventors have recognized that sodium citrate may advantageously also be used in a slosh damper of a wind turbine.

Note that, in principle, also other citrates than the mentioned ones could be used for being dispersed in the liquid, resulting in an aqueous liquid which has beneficial properties when used in a slosh damper of a wind turbine.

It is, however, desirable for a citrate to be selected from sodium- and/or potassium citrate. Particularly, the citrate is selected from potassium citrate.

The described damper is suitable for damping movements of a wind turbine. In other words, it is arranged and prepared to dampen undesired movements of the wind turbine. The term "undesired movements" of the wind turbine is to be understood as any movement of the wind turbine which shall be suppressed or ideally eliminated completely by means of the damper. Oftentimes, these undesired movements are oscillatory movements due to the rotating rotor and/or—in case of an offshore wind turbine—due to waves which are hitting the foundation of the wind turbine.

The container of the damper can be any receptacle which is suitable to accommodate the aqueous liquid of the damper. In practice, the container is oftentimes made of metal, e. g. steel, and has a rectangular or circular base. Oftentimes, a plurality of containers is provided per wind turbine.

In an advantageous embodiment of the invention, the amount of citrate comprised in the aqueous liquid is less than 70% by weight. In another advantageous embodiment of the invention, the amount of citrate in the aqueous liquid is at least 30% by weight.

Such a considerable amount of citrate comprised in the aqueous liquid, such as in the water, has the effect that the density of the aqueous liquid increases significantly. This is beneficial in terms of the capability and efficiency of the aqueous liquid to damp the undesired movements of the wind turbine, such as oscillations of the nacelle and/or tower of the wind turbine. Roughly speaking, the more citrate is contained in the aqueous liquid, the more the density of the aqueous liquid increases and, consequently, the more efficiently any movements of the wind turbine are damped.

However, there may be a solubility limit of the citrate in aqueous liquid (the exact value thereof depending amongst other on the specific type of the citrate and of the temperature of the aqueous liquid and/or of any other components comprised in the aqueous liquid). Experiments carried out by the inventors have shown that the amount of citrate comprised in the aqueous liquid is thus below 70% by weight.

Specifically, an amount of citrate contained in the aqueous liquid is at least 50% by weight and/or not more than 65% by weight. To give a concrete example, 60 g of citrate added to 40 ml of water would result in an aqueous liquid for a damper of a wind turbine.

In the conventional art, tap water is used to fill the container of the damper. A main advantage of using tap water is that it is inexpensive and readily available.

Embodiments of the present invention proposes, in an embodiment, to use deionized water. Deionized water, which is also referred to as demineralized water, is tap water wherein substantially all of its mineral ions have been removed. It is, not surprisingly, considerably more expensive than tap water but has the advantage that it is clean and controlled. Given the overall costs of the damper, it could be worth to opt for deionized water for the aqueous liquid of the damper.

According to an embodiment, an advantageous aqueous liquid has a pH of about 8 and/or up to about 12, preferably of about 9 and/or up to about 11, most preferably of about 9.4 and/or up to about 10.

In an advantageous embodiment of the invention, the aqueous liquid further comprises an antifreeze to lower the freezing point of the aqueous liquid.

Examples of a suitable antifreeze agent are monoethylene glycol and/or monopropylene glycol. However, any other antifreeze agent which is capable of lowering the freezing point may be used as well. The antifreeze agent is selected from monopropylene glycol.

In another advantageous embodiment of the invention, the aqueous liquid further comprises a corrosion inhibitor for reducing or even preventing corrosion of parts of the damper.

Although the citrates as such already have anti-corrosive and anti-oxidizing properties, it may be desirable to add a specific corrosion inhibitor to further reduce or suppress any corrosion of parts of the damper. Therefore, it might be chosen to add a special corrosion inhibitor to the aqueous liquid. An exemplary corrosion inhibitor for this purpose may be chosen from an organic and/or inorganic compound. A corrosion inhibitor is selected from at least one of a carbonate, borate, molybdate, nitrate, silicate, amine, sulfonate and/or azole.

In yet another advantageous embodiment of the invention, the aqueous liquid further comprises a biocide, such as an antimicrobial or a pesticide. This serves the purpose to maintain the aqueous liquid of the damper clean, i.e. to suppress the growth of any bacteria or algae for months or even years. The biocides are applied in accordance with Directive 98/8/EC and may be selected, e. g. from non-metallic organo-sulfur biocide such as Methylene Bis-Thiocynate (MBT) (Aquapharm).

Such a biocide may be used in an amount of at least 0.001% by weight and/or up to 0.5% by weight of at least 0.05% by weight and/or up to 0.2% by weight in the final aqueous liquid.

According to a further embodiment, the aqueous liquid may comprise a dye. Such a dye may be used, e. g. to stain the aqueous liquid and is typically used as a water-soluble component. Depending on staining requirements, the content of such a dye may vary from about 0.0002% by weight to 0.001% by weight in the final aqueous liquid.

As it has become clear from the above description, there exist various variants and options how the aqueous liquid of the damper is concretely realised.

According to an embodiment, the aqueous liquid comprises:

water, such as deionized water, at an amount of at least 1% by weight and/or up to 60% by weight, at least one citrate at a total amount of at least 1% by weight and/or up to 65% by weight, at least one glycol at a total amount of at least 0.1% by weight and/or up to 30% by weight, and optionally a corrosion inhibitor at a total amount of at least 0.1% by weight and/or up to 6% by weight.

Note that the percentages by weight of the above components relate to the aqueous liquid in total. Also note that, the at least one citrate/s, the at least one glycol and the corrosion inhibitor are molecularly dispersed in the aqueous liquid once that the damper is ready for use in the wind turbine.

A second aspect of embodiments of the present invention relates to a wind turbine comprising a damper according to one of the embodiments described above.

Advantageously, the wind turbine is located off the shores. Offshore, ocean waves are usually continuously hitting the foundation of the turbine and thus create or at least contribute to undesired movements, in particular oscillatory movements, of the wind turbine.

Exemplarily, the damper is located in the upper third of the tower of the wind turbine. The term "one third of the tower" only relates to the tower as such, i.e., not including any foundation or jacket/monopile structure of the wind turbine.

For sake of conciseness, specific embodiments of the damper of the wind turbine will not be repeated in the following. Instead, all features and advantages described in the context of the damper as such also apply to the wind turbine with said damper.

A third aspect of embodiments of the present invention relates to a specific composition and an aqueous liquid obtained from such a composition.

According to an embodiment, the composition is used in a damper of a wind turbine.

The composition as such may be in a solid phase or a liquid phase. If it is in the solid phase (e. g. provided as a powder), the composition is advantageously substantially or completely dispersed, i. e. molecularly dispersed in the liquid, to form an aqueous liquid. The composition is dispersed in water.

A composition according to embodiments of the present invention comprises at least one citrate and at least one glycol, wherein the citrate is selected from potassium citrate and/or sodium citrate, or from potassium citrate, and wherein the at least one glycol is selected from monoethylene glycol and/or from monopropylene glycol, such as from monopropylene glycol.

The aqueous liquid may advantageously, after the addition of the composition, be mixed to substantially dissolve or disperse the component, respectively, thereby forming a dispersion of the inventive aqueous liquid as described above.

According to embodiments of the invention, dispersion of the components of the composition in a liquid, desirably in water, advantageously increases density of the liquid, in particular of water.

According to an embodiment, an advantageous composition comprises potassium citrate and/or sodium citrate, such as potassium citrate.

In detail, an embodiment of an advantageous composition comprises potassium citrate at an amount of at least 1.2% by weight and/or up to 65% by weight and/or sodium citrate at an amount of at least 1.5% by weight and/or up to 65% by weight, monoethylene glycol at an amount of at least 2.2% by weight and/or up to 97% by weight and/or monopropylene glycol at an amount of at least 5.1% by weight and/or up to 94% by weight, and optionally at least one corrosion inhibitor at an amount of at least 1.03% by weight and/or up to 22% by weight.

A further advantageous composition comprises:

potassium citrate at an amount of at least 40% by weight and/or up to 65% by weight, or desirably 50% by weight, optionally sodium citrate at an amount of 0.1% by weight and/or up to 20% by weight, or desirably 10% by weight, monopropylene glycol at an amount of 20% by weight and/or up to 40% by weight, or desirably 30% by weight, optionally monoethylene glycol at an amount of up to 30% by weight, and at least one corrosion inhibitor at a total amount of at least 1% by weight and/or up to 5% by weight.

Advantageously, the above components are homogeneously dispersed in an aqueous liquid, such as in water, particularly in deionized water.

Embodiments of the invention thus also relate to an aqueous liquid prepared by dispersing an inventive composition in a liquid, such as in water, particularly in deionized water.

According to an embodiment an aqueous liquid comprises or consists of:

water, such as deionized water, at an amount of at least 10% by weight and/or up to 50% by weight, potassium citrate at an amount of at least 1% by weight and/or up to 60% by weight, at an amount of at least 25% and/or up to 60% by weight, and optionally sodium citrate at an amount of at least 1% by weight and/or up to 60% by weight, monoethylene glycol at an amount of at least 1% by weight and/or up to 30% by weight and/or monopropylene glycol at an amount of at least 1% by weight and/or up to 30% by weight, and optionally at least one corrosion inhibitor at a total amount of at least 1% by weight and/or up to 5% by weight.

A further aqueous liquid comprises or consists of:

water, such as deionized water, at an amount of at least 25% by weight and/or up to 45% by weight, at least one citrate, such as potassium citrate, at an amount of at least 50% by weight and/or up to 63% by weight, monopropylene glycol at an amount of at least 5% by weight and/or up to 15% by weight and at least one corrosion inhibitor at a total amount of at least 2% by weight and/or up to 5% by weight.

According to a particular embodiment, an aqueous liquid comprises or consists of:

water, such as deionized water, at an amount of 30% by weight, potassium citrate at an amount of 62% by weight, monopropylene glycol at an amount of 5% by weight and at least one corrosion inhibitor, such as at least one azole, at a total amount of 3% by weight.

Advantageously, an above alluded composition, i. e. an above specified aqueous liquid, is used in a damper, such as in a damper of a wind turbine.

All of the components of the composition, i. e. the aqueous liquid, have the advantage that they are environmentally friendly. They are therefore components that do not show any toxicity whatsoever in small amounts, and also are not corrosive or oxidizing.

The aqueous liquid of embodiments of the invention has the advantage of being suitable for use in a wide variety of industrial applications. It provides a significant advantage over other alternative formulations of the conventional art.

As mentioned above, unlike other compositions known for increasing the density of a liquid, such as water, the present composition, in particular the present aqueous liquid, does not show any harmful effect on human health whatsoever.

Furthermore, as a result of the presence of salts in the specific composition, one can avoid the development of microorganisms or other contaminant substances or components therein. This provides an additional advantage, as one thus avoids the use of chemical decontaminants, which often entail problems with contamination of the water in which they are used. Because of the ingredients comprised in the specific composition, in particular the aqueous liquid, it is particularly well-suited for withstanding low temperatures (for example, temperatures of between −10° C. and −28° C.) without freezing.

EXAMPLES: PREPARATION OF AN AQUEOUS LIQUID ACCORDING TO EMBODIMENTS OF THE PRESENT INVENTION

In order to demonstrate the advantages of embodiments of the invention, six examples of aqueous liquids were prepared.

Example 1

| Components | Amount of component [% by weight] |
|---|---|
| Potassium citrate (CAS 6100-05-6) | 62 |
| Monopropylene glycol (CAS 57-55-6) | 5 |
| Deionized water (CAS 7732-18-5) | 30 |
| Mixture of corrosion inhibitors | 3 |

The components were added to the amount of deionized water to result in an aqueous liquid according to embodiments of the invention. The aqueous liquid was mixed at room temperature (25° C.) by stirring until a homogenous mixture was obtained.

Density of the aqueous liquid was measured using a Proton densimeter (1.500-1.600 s. g.) at a temperature of 20° C. to result in an experimental density of 1.512 kg/L.

Example 2

| Components | Amount of component [% by weight] |
|---|---|
| Potassium citrate (CAS 6100-05-6) | 66 |
| Monopropylene glycol (CAS 57-55-6) | 1 |
| Deionized water (CAS 7732-18-5) | 33 |
| Corrosion inhibitor | — |

The aqueous liquid was prepared as detailed in Example 1.

Density of the aqueous liquid was measured using a Proton densimeter (1.500-1.600 s. g.) at a temperature of 20° C. to result in an experimental density of 1.536 kg/L.

Example 3

| Components | Amount of component [% by weight] |
|---|---|
| Potassium citrate (CAS 6100-05-6) | 50 |
| Sodium citrate (CAS 6132-04-3) | 7 |
| Monoethylene glycol (CAS 107-21-1) | 30 |
| Monopropylene glycol (CAS 57-55-6) | 7 |
| Deionized water (CAS 7732-18-5) | 3 |
| Mixture of corrosion inhibitors | 3 |

The aqueous liquid was prepared as detailed in Example 1.

Density of the aqueous liquid was measured using a Proton densimeter (1.400-1.500 s. g.) at a temperature of 20° C. to result in an experimental density of 1.437 kg/L.

Example 4

| Components | Amount of component [% by weight] |
|---|---|
| Potassium citrate (CAS 6100-05-6) | 50 |
| Sodium citrate (CAS 6132-04-3) | — |
| Monoethylene glycol (CAS 107-21-1) | 13 |
| Monopropylene glycol (CAS 57-55-6) | — |
| Deionized water (CAS 7732-18-5) | 35 |
| Mixture of corrosion inhibitors | 1.9 |
| Biocide | 0.1 |
| Dye | 0.0005 |

The aqueous liquid was prepared as detailed in Example 1.

Density of the aqueous liquid was measured using a Proton densimeter (1.400-1.500 s. g.) at a temperature of 20° C. to result in an experimental density of 1.420 kg/L.

Example 5

| Components | Amount of component [% by weight] |
|---|---|
| Potassium citrate (CAS 6100-05-6) | 55 |
| Sodium citrate (CAS 6132-04-3) | — |
| Monoethylene glycol (CAS 107-21-1) | — |
| Monopropylene glycol (CAS 57-55-6) | 9 |
| Deionized water (CAS 7732-18-5) | 35 |
| Mixture of corrosion inhibitors | 1 |
| Biocide | — |
| Dye | 0.0005 |

The aqueous liquid was prepared as detailed in Example 1.

Density of the aqueous liquid was measured using a Proton densimeter (1.400-1.500 s. g.) at a temperature of 20° C. to result in an experimental density of 1.462 kg/L.

Example 6

| Components | Amount of component [% by weight] |
|---|---|
| Potassium citrate (CAS 6100-05-6) | 60 |
| Sodium citrate (CAS 6132-04-3) | — |
| Monoethylene glycol (CAS 107-21-1) | — |
| Monopropylene glycol (CAS 57-55-6) | — |
| Deionized water (CAS 7732-18-5) | 39.8 |
| Mixture of corrosion inhibitors | — |
| Biocide | 0.2 |
| Dye | — |

The aqueous liquid was prepared as detailed in Example 1.

Density of the aqueous liquid was measured using a Proton densimeter (1.400-1.500 s. g.) at a temperature of 20° C. to result in an experimental density of 1.495 kg/L.

No freezing of the aqueous liquids prepared according to Examples 1 to 6 was observed at low temperatures of between −10° C. and −28° C.

For the above depicted Examples 1, 3, 4 and 5 the corrosion inhibitor was selected from the group of a carbonate, borate, molybdate, nitrate, silicate, amine, sulfonate and/or azole.

The aqueous liquids according to Examples 1 to 6 were successfully implemented in wind turbines for buffering wind variations in the wind turbines located either on land or offshore and were even shown to buffer ocean waves.

BRIEF DESCRIPTION

Some of the embodiments will be described in detail, with reference to the following FIGURES, wherein like designations denote like members, wherein:

FIG. 1 shows a wind turbine with a tower damper.

DETAILED DESCRIPTION

FIG. 1 shows a wind turbine 10 comprising a tower 11 with a base 113 and a top 114. At the top 114 of the tower 11 a nacelle 12 is placed. The nacelle 12 accommodates a generator (not shown) and a rotor (not shown) of the wind turbine 10. At one side of the nacelle 12, a hub 14 is mounted. The hub 14 is mounted rotatable with regard to the nacelle 12. The hub 14 is provided with three rotor blades 15, of which two are shown in FIG. 1. The wind turbine 10 might be a direct drive wind turbine without a gear box or a geared wind turbine with a gear box.

The height of the tower 11 exemplarily exceeds seventy meters. Thus, it is convenient to provide an elevator 13 which connects the base 113 of the tower 10 with the top 114 of the tower 10. The elevator 13 is basically used for the service personnel which needs to access the nacelle 12, the hub 14 or the rotor blades 15. Alternatively, stairs or a ladder may also be installed inside of the tower 11. The space which is needed and occupied by the elevator 13 is referred to as space 16 for the elevator 13. Close to the top 114 of the tower 11 a damper 20 with a shape of a toroid is located. Various other shapes of the damper, e.g., cuboid or cylindrical shapes, are possible, too. The damper 20 comprises a container 40 which is filled with an aqueous liquid 30 according to embodiments of the present invention. The damper 20 is placed close to the space 16 for the elevator 13.

An aspect of the damper 20 is to damp, i.e., to reduce movements of the tower 11. These movements may be linear movements in a plane perpendicular to the tower 11 or circular or elliptical movements. The movements may be oscillating movements. Due to the mass of the aqueous liquid 30, a force which is acting against the movement of the tower 11 is damping this movement. The damper 20 comprises an aqueous liquid 30 as described in the description of embodiments of the invention above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A damper for damping oscillatory movements of a tower of a wind turbine, the damper comprising: a container located in an upper third of the tower of the wind turbine, wherein the container is in a shape of a toroid;
- an aqueous liquid contained in the container
- that damps the oscillatory movement of the wind turbine, wherein the aqueous liquid comprises:
  - potassium citrate at an amount of 50% to 66% by weight;
  - at least one glycol selected from monoethylene glycol at an amount of up to 30% by weight, and monopropylene glycol at an amount of up to 9% by weight;
  - water at an amount of 3% to 40% by weight;
  - at least one corrosion inhibitor at a total amount of 1% to 3% by weight for reducing or even preventing corrosion of parts of the damper; and
  - a biocide at an amount up to 0.1% by weight to suppress a growth of any bacteria or algae.

2. The damper according to claim 1, wherein the water is deionized water.

3. The damper according to claim 1, wherein the aqueous liquid further comprises an antifreeze.

4. The damper according to claim 1, wherein the corrosion inhibitor is selected from at least one of a borate, molybdate, nitrate, silicate, amine, sulfonate and/or azole.

5. The damper according to claim 1 wherein the aqueous liquid comprises:
- potassium citrate at an amount of 50%,
- sodium citrate at an amount of 7%,
- monoethylene glycol at an amount of 30%,
- monopropylene glycol at an amount of 7%,
- water at an amount of 3%, and
- the at least one corrosion inhibitor at a total amount of 3%.

6. A wind turbine comprising the damper according to claim 1.

7. The damper according to claim 1 wherein the aqueous liquid comprises:
- potassium citrate at an amount of 50%,
- monoethylene glycol at an amount of 13%,
- water at an amount of 35%,
- the at least one corrosion inhibitor at a total amount of 1.9%,
- the biocide at an amount of 0.1%, and
- a dye.

8. The damper according to claim 1 wherein the aqueous liquid comprises:
- potassium citrate at an amount of 55%,
- monopropylene glycol at an amount of 9%,
- water at an amount of 35%, and the at least one corrosion inhibitor at a total amount of 1%, and a dye.

9. The damper according to claim 1, wherein the tower includes a space for an elevator that connects a base of the tower to a top of the tower, and the container is located proximate the top of the tower and encircling the space for the elevator.

* * * * *